H. Dillaway,
Glass Mold.

No. 79,738. Patented July 7, 1868.

Witnesses.
L. H. Latimer
J. B. Kidder

Inventor.
Hiram Dillaway
By his Attys
Crosby Halsted & Gould

United States Patent Office.

HIRAM DILLAWAY, OF SANDWICH, MASSACHUSETTS.

Letters Patent No. 79,738, dated July 7, 1868.

IMPROVEMENT IN COOLING GLASSWARE-MOULDS.

*The Schedule referred to in these Letters Patent and making part of the same.*

TO ALL WHOM IT MAY CONCERN:

Be it known that I, HIRAM DILLAWAY, of Sandwich, in the county of Barnstable, and State of Massachusetts, have invented an Improvement in Cooling Glassware-Moulds; and I do hereby declare that the following, taken in connection with the drawings which accompany and form part of this specification, is a description of my invention sufficient to enable those skilled in the art to practise it.

I am aware that glassware-moulds have been cooled by causing water, or other suitable cooling-media, to flow through them, to conduct heat therefrom, as may be seen, for example, in the United States patent of Leasure and Gill, December 4, 1866; and my invention, therefore, may be said to relate to the detail by which I apply water to glassware-moulds, to cool them when they become too hot during use, or to prevent them from becoming overheated under use.

The invention herein set forth has reference to that class of glassware-moulds which have but three parts, viz, the body, follower, and the plunger, or rather to that class of moulds in which the body operates as but one piece, in not opening or separating into parts to deliver the moulded article, but is simply reversed in position, so as to let the moulded article drop or fall out; and my invention consists in such an arrangement, construction, and combination of parts as enables me to attach the water-reservoir to the body of the mould, so that both will move together to and from the press, and so that the mould and reservoir may together be inverted, without causing the water immediately to leave the reservoir.

Figure 1:
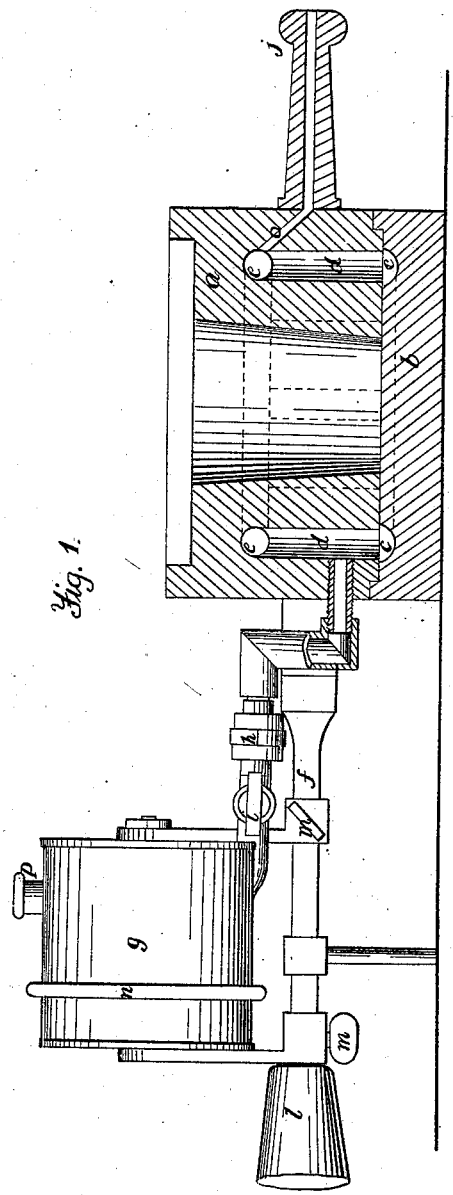
Figure 2:
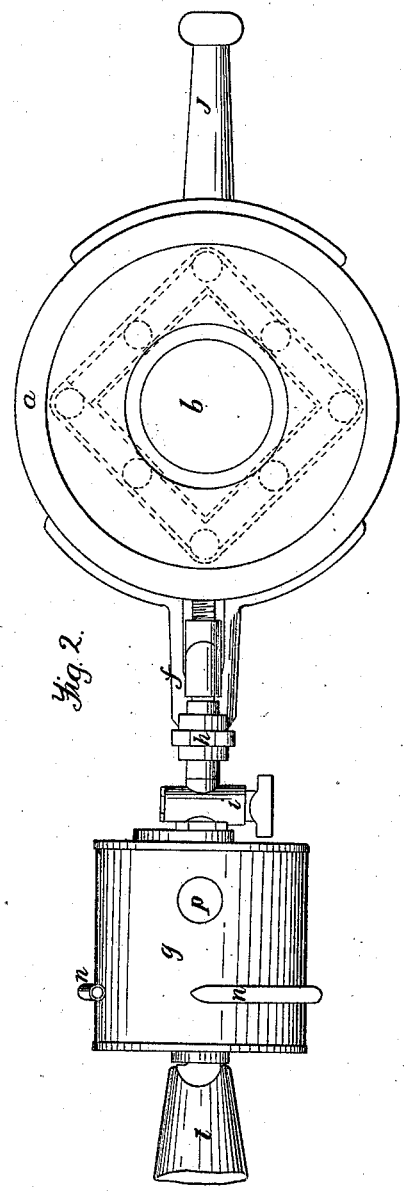

The drawing, Figure 1, shows, in sectional elevation, a glassware-mould body, with a reservoir for water attached, so as to move therewith as an integral part of the body, and Figure 2 shows the same in plan.

The mould shown is one for making plain tumblers. It is formed in two pieces, $a$ and $b$, which are joined together, and do not act or move as separate parts in the delivery of the moulded ware, the construction in two parts being designed solely to facilitate making the passages in which the water circulates.

In the part $b$, a groove is formed at $c$, and as shown also by dotted lines in fig. 2. This groove forms a medium of communication with all of the holes $d$, drilled vertically in the part $a$, and cross-horizontally drilled holes, $e$, connect the holes $d$ at their tops in the part $a$ of the mould-body. The horizontal holes are drilled from the outside of the mould-body, the entering places of the drill being closed by suitable plugs.

The mould-body is provided with a handle-tang, $f$, to which is secured, by a coupling-joint, $h$, a closed reservoir, $g$, designed to contain water, which can flow through a suitable pipe, in which is the coupling-joint $h$, the water being used to cool the mould-body, and the flow being regulated by the cock $i$, passing off either as hot water or steam through the passage in the trunnion $j$.

The handle $l$ is screwed upon the tang $f$, so as to be easily removable therefrom, and when removed, and when the coupling-joint $h$ is uncoupled, the water-reservoir $g$ can be removed from the mould by simply loosening the set-screws $m$, and sliding the reservoir off from the tang $f$, so that the mould-body can be used as is any other mould-body, without provision for cooling it. Air must be supplied to the reservoir in order to allow the water to flow from it through the water-passages in the mould-body, and to supply the air necessary to permit the flow of water, and at the same time to prevent the water from flowing out of the reservoir at the air-passage. This is fitted with a tube, $n$, which is coiled around the reservoir, and has an end left open, as shown.

The trunnion is in line with the handle, as is usual with moulds which are inverted to discharge their contents, and the mould is turned over the edge of a table or work-bench, on the knob at the end of the trunnion.

The trunnion-passage is connected with the passages $e$, where any generated steam will collect, by the passage $o$, drilled slantwise, as shown. The reservoir is filled through the passage closed by cap $p$.

I claim the combination, with a glassware-mould body, of a water-reservoir, in such a manner that the reservoir forms a part of the mould-body, and moves therewith, without making and breaking the connection between the reservoir and the mould-body at each impression obtained from the mould, substantially as described.

Also, the combination, with a glass-mould body, of a close reservoir, made with the coiled air-tube, substantially as described.

Also, a mould-body, made with drilled passages $e\ d\ o$, connected by the trough-like passage $c$, substantially as described.

HIRAM DILLAWAY.

Witnesses:
LUTHER DRAKE,
JAMES D. LLOYD.